US005320909A

United States Patent [19]

Scharman et al.

[11] Patent Number: 5,320,909

[45] Date of Patent: Jun. 14, 1994

[54] CERAMIC THERMAL BARRIER COATING FOR RAPID THERMAL CYCLING APPLICATIONS

[75] Inventors: Alan J. Scharman, Hebron, Conn.; Thomas M. Yonushonis, Columbus, Ind.

[73] Assignees: United Technologies Corporation, Hartford, Conn.; Cummins Engine Co., Columbus, Ind.

[21] Appl. No.: 91,077

[22] Filed: Jul. 13, 1993

Related U.S. Application Data

[63] Continuation of Ser. No. 890,459, May 29, 1992, abandoned.

[51] Int. Cl.[5] .................... B32B 15/20

[52] U.S. Cl. .................... 428/472; 415/174.4; 416/241 B; 428/469; 428/615; 428/622; 428/623; 428/632; 428/633; 428/636; 428/697; 428/699; 428/701; 428/702

[58] Field of Search .................... 428/615, 622, 623, 632, 428/633, 636, 469, 472, 697, 699, 701, 702; 416/241 B; 415/174.4

[56] References Cited

U.S. PATENT DOCUMENTS

| | | | |
|---|---|---|---|
| 3,359,192 | 11/1970 | Prasse | 277/223 |
| 3,949,522 | 4/1976 | Kaneko et al. | 428/469 |
| 4,481,237 | 11/1984 | Bosshart et al. | 427/376.4 |
| 4,495,907 | 11/1985 | Kamo | 123/193 C |
| 4,503,128 | 3/1985 | Iseli et al. | 428/469 |
| 4,503,130 | 3/1985 | Bosshart et al. | 428/632 |
| 4,542,111 | 9/1985 | Buran et al. | 501/127 |
| 4,561,406 | 12/1985 | Ward | 123/536 |
| 4,574,590 | 3/1986 | Jones | 60/676 |
| 4,587,177 | 5/1986 | Toaz et al. | 428/614 |
| 4,588,607 | 5/1986 | Matarese et al. | 427/33 |
| 4,645,716 | 2/1987 | Harrington et al. | 428/472 |
| 4,651,630 | 3/1987 | Zeilinger et al. | 92/212 |
| 4,711,208 | 12/1987 | Sander et al. | 123/271 |
| 4,735,128 | 4/1988 | Mahrus et al. | 92/212 |
| 4,738,227 | 4/1988 | Kamo et al. | 123/23 |
| 4,739,738 | 4/1988 | Sander et al. | 123/271 |

FOREIGN PATENT DOCUMENTS 0340791 11/1989 European Pat. Off. .

OTHER PUBLICATIONS

*Thick Thermal Barrier Coating for Diesel Components*, Monthly Progress Reports 39, 40, and 41 (Jun., Jul., and Aug. 1989) Contract DEN3-331, by T. M. Yonushonis, Cummins Engine Company Inc., prepared for NASA-Lewis Research Center.

*Primary Examiner*—A. A. Turner
*Attorney, Agent, or Firm*—George J. Romanik

[57] ABSTRACT

A thermal barrier coating for metal articles subjected to rapid thermal cycling includes a metallic bond coat deposited on the metal article, at least one MCrAlY/ceramic layer deposited on the bond coat, and a ceramic top layer deposited on the MCrAlY/ceramic layer. The M in the MCrAlY material is Fe, Ni, Co, or a mixture of Ni and Co. The ceramic in the MCrAlY/ceramic layer is mullite or $Al_2O_3$. The ceramic top layer includes a ceramic with a coefficient of thermal expansion less than about $5.4\times10^{-6}{}^{\circ}C^{-1}$ and a thermal conductivity between about 1 J $sec^{-1}m^{-1}{}^{\circ}C^{-1}$ and about 1.7 J $sec^{-1}m^{-1}{}^{\circ}C^{-1}$.

6 Claims, 1 Drawing Sheet

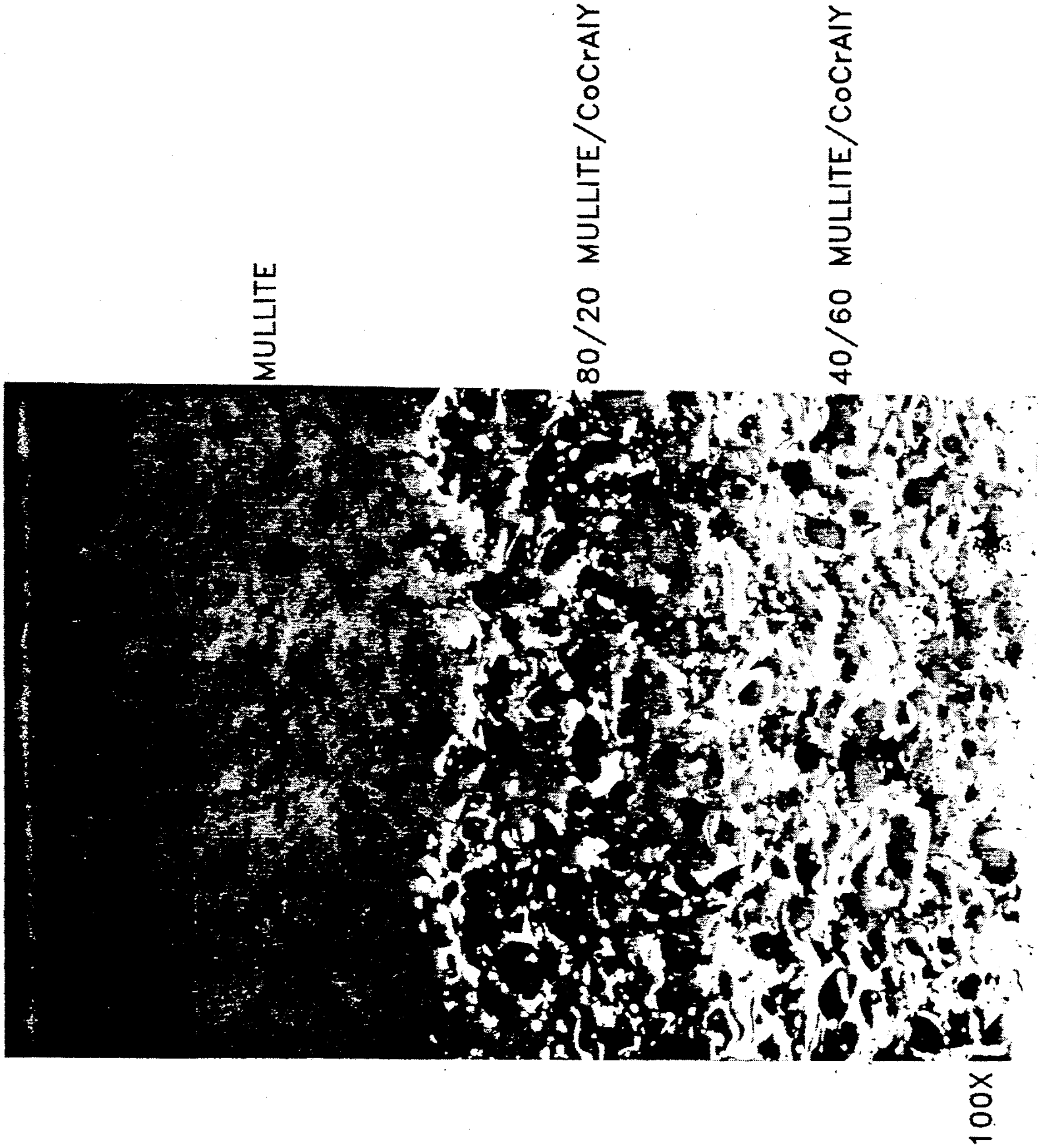
MULLITE
80/20 MULLITE/CoCrAlY
40/60 MULLITE/CoCrAlY
100X

CERAMIC THERMAL BARRIER COATING FOR RAPID THERMAL CYCLING APPLICATIONS

This invention was made with Government support under contract number DEN3-331 awarded by the Department of Energy and contract number DAAE07-84-C-R082 awarded by the Department of the Army. The Government has certain rights in this invention.

This application is a continuation of copending U.S. application Ser. No. 07/890,459, filed May 29, 1992 now abandoned.

TECHNICAL FIELD

The present invention is directed to a ceramic thermal barrier coating for rapid thermal cycling applications, such as internal combustion engines.

BACKGROUND ART

To improve performance and efficiency, future internal combustion engines will operate at higher temperatures and pressures than present-day engines. For example, commercial diesel engines may operate at cylinder temperatures of about 760° C. (1400° F.) to about 870° C. (1600° F.) and brake mean effective pressures averaging about 1030 kPa (150 psi). Military diesel engines may operate at cylinder temperatures up to about 925° C. (1700° F.) and brake mean effective pressures greater than about 1380 kPa (200 psi). Such conditions, combined with rapid thermal cycling induced by the cylinder firing cycle, create a severe environment for in-cylinder engine parts. To operate under such conditions, critical engine parts must be insulated. Insulation lowers the temperature of the parts and reduces the amount of heat rejected to the environment. To be cost effective, the insulation should have a service life greater than about 20,000 hours.

U.S. Pat. No. 4,738,227 to Kamo et al. describes a two-layer thermal barrier coating for insulating parts in internal combustion engines. The coating includes a base layer of zirconia ($ZrO_2$) plasma sprayed over a metal engine part. The $ZrO_2$ layer is covered with a layer of a wear resistant ceramic to improve its service life. Suitable wear resistant ceramics include one containing silica ($SiO_2$), chromia ($Cr_2O_3$), and alumina ($Al_2O_3$) and another based on zircon ($ZrSiO_4$).

U.S. Pat. No. 4,711,208 to Sander et al. discloses coating piston heads with several layers of flame or plasma sprayed material. The layers can include $ZrO_2$, $ZrSiO_4$, metal, and cermet. Sander et al. also teach that an aluminum titanate piston crown insert covered with a fully stabilized $ZrO_2$ coating can replace the multilayered insulation.

Similar, multilayered, ceramic thermal barrier coatings are used in the aerospace industry to insulate turbine blades in gas turbine engines. Gas turbine engine parts, however, are not subjected to rapid thermal cycling as are internal combustion engine parts. U.S. Pat. Nos. 4,481,237 to Bosshart et al. and 4,588,607 to Matarese et al. teach coatings that include a metallic bond coat deposited on a metal substrate, a metal/ceramic layer deposited on the bond coat, and a $ZrO_2$ ceramic top layer deposited on the metal/ceramic layer.

Although $ZrO_2$-based thermal barrier coatings allow internal combustion engines to operate under severe conditions, to date, they have not achieved the desired service life. Therefore, what is needed in the art is a thermal barrier coating that allows internal combustion engines to operate under severe conditions, while achieving an acceptable service life.

DISCLOSURE OF THE INVENTION

The present invention is directed to a thermal barrier coating that allows internal combustion engines to operate under severe conditions, while achieving an acceptable service life.

The invention includes a metal article coated with a thermal barrier coating that is subjected to rapid thermal cycling. The thermal barrier coating includes a metallic bond coat deposited on the metal article, at least one MCrAlY/ceramic layer deposited on the bond coat, and a ceramic top layer deposited on the MCrAlY/ceramic layer. The M in the MCrAlY material is Fe, Ni, Co, or a mixture of Ni and Co and the ceramic in the MCrAlY/ceramic layer is mullite or $Al_2O_3$. The ceramic top layer includes a ceramic with a coefficient of thermal expansion less than about $5.4\times10^{-6}$°$C^{-1}$ and a thermal conductivity between about 1 J $sec^{-1}m^{-1}$°$C^{-1}$ and about 1.7 J $sec^{-1}m^{-1}$°$C^{-1}$.

These and other features and advantages of the present invention will become more apparent from the following description and accompanying drawing.

BRIEF DESCRIPTION OF THE DRAWING

The FIGURE is a photomicrograph of a thermal barrier coating of the present invention.

BEST MODE FOR CARRYING OUT THE INVENTION

The thermal barrier coating of the present invention is a multilayer coating that includes a metallic bond coat, at least one metal/ceramic layer deposited on the bond coat, and a ceramic top layer deposited on the metal/ceramic layer. The ceramic top layer has thermal properties adapted for rapid thermal cycling applications. The coating and its individual layers can be any thickness required for a particular application. Preferably, the coating will be about 0.3 mm (12 mils) to about 2.5 mm (100 mils) thick.

The bond coat can be any material known in the art that creates good bonds with a metal substrate and the metal/ceramic layer. One suitable material is a Ni-Cr-Al composition used in the aerospace industry. Such a material is commercially available as Metco ® 443 from the Metco division of Perkin-Elmer Corporation (Westbury, N.Y.). Preferably, the bond coat will be about 0.1 mm (4 mils) to about 0.15 mm (6 mils) thick.

The metal/ceramic layer can comprise a MCrAlY material, where M is Fe, Ni, Co, or a mixture of Ni and Co, and a ceramic material, such as mullite ($3Al_2O_3\cdot2SiO_2$), $Al_2O_3$, or any other suitable ceramic, such as zircon ($ZrSiO_4$), sillimanite ($Al_2O_3.SiO_2$), sodium zirconium phosphate ($NaZrPO_4$), fused silica ($SiO_2$), cordierite ($Mg_2Al_4Si_5O_8$), or aluminum titanate ($AlTiO_4$), in any suitable proportion. MCrAlY materials are known in the aerospace industry and can be obtained from Union Carbide Specialty Powders (Indianapolis, Ind.) or Sulzer Plasma Alloy Metals (Troy, Mich.). The ceramic materials are well known and readily available. Preferably, the coating will have a first, constant composition metal/ceramic layer deposited on the bond coat and a second, graded composition metal/ceramic layer deposited on the first metal/ceramic layer. For example, the first, constant composition metal/ceramic layer can comprise about 20 wt % to about 60 wt % CoCrAlY (nominally Co-23Cr-13Al-0.65Y) and about 80 wt % to about 40% wt % mullite or $Al_2O_3$ and can be about 0.1 mm (4 mils) to about 0.5 mm (20 mils) thick. The composition of the second, graded metal/ceramic layer can vary continuously from the composition of the first metal/ceramic layer to a suitable composition having a higher proportion of mullite or $Al_2O_3$. For example, the final composition can include about 15 wt % to about 20 wt % CoCrAlY and about 85 wt % to about 80 wt % mullite. The second metal/ceramic layer can be about 0.1 mm (4 mils) to about 0.5 mm (20 mils) thick.

The ceramic top layer should have thermal properties suitable to local rapid thermal cycling such as that encountered when portions of the coating's surface vary by more than about 110° C. (200° F.) from the mean surface temperature. Preferably, the ceramic top layer's thermal properties will permit the coating to withstand temperature variations of at least about 278° C. (500° F.) from the mean surface temperature. In addition, the ceramic top layer's thermal properties should permit the coating to survive combustion or other cyclic events that occur at least about 1 cycle per second and, preferably, at least about 15 cycles per second. These properties permit the thermal barrier coating of the present invention to overcome the spalling problems observed when prior art $ZrO_2$-based coatings are exposed to rapid thermal cycling. These problems can be explained in the context of a thermal barrier coating on a diesel engine piston crown, the top of the piston. As fuel in a cylinder burns, it creates localized hot spots on the piston crown. The hot spots generate in-plane and through-thickness temperature gradients in the coating. Because of the temperature gradients, especially the in-plane gradients, parts of the coating expand more than other parts. This creates thermal stresses in the coating. With prior art $ZrO_2$-based coatings, the rapid cycling of thermal stresses as the cylinder firing cycle proceeds forms cracks in the coating. As the cracks grow, parts of the coating spall off and expose an uncoated surface of the piston to the severe conditions in the cylinder.

The coating of the present invention overcomes this problem because the ceramic top layer has a coefficient of thermal expansion (CTE) less than about $5.4\times10^{-6}$°C$^{-1}$ ($3.0\times10^{-6}$°F$^{-1}$) and a thermal conductivity between about 1 J sec$^{-1}$m$^{-1}$°C$^{-1}$ (7 Btu hr$^{-1}$ft$^{-2}$(°F./in)$^{-1}$) and about 1.7 J sec$^{-1}$m$^{-1}$°C$^{-1}$ (12 Btu hr$^{-1}$ft$^{-2}$(°F./in)$^{-1}$). Preferably, the CTE will be less than about $4.9\times10^{-6}$°C$^{-1}$ ($2.7\times10^{-6}$°F$^{-1}$) and the thermal conductivity will be between about 1.1 J sec$^{-1}$m$^{-1}$°C$^{-1}$ (7.5 Btu hr$^{-1}$ft$^{-2}$(°F./in)$^{-1}$) and about 1.4 J sec$^{-1}$m$^{-1}$°C$^{-1}$ (10 Btu hr$^{-1}$ft$^{-2}$(°F./in)$^{-1}$). By comparison, $ZrO_2$ has a CTE of about $7.7\times10^{-6}$°C$^{-1}$ ($4.3\times10^{-6}$°F$^{-1}$) to about $9.4\times10^{-6}$°C$^{-1}$ ($5.2\times10^{-6}$°F$^{-1}$) and a thermal conductivity of 0.7 J sec$^{-1}$m$^{-1}$°C$^{-1}$ (4.5 Btu hr$^{-1}$ft$^{-2}$(°F./in)$^{-1}$) to 0.8 J sec$^{-1}$m$^{-1}$°C$^{-1}$ (5.3 Btu hr$^{-1}$ft$^{-2}$(°F./in)$^{-1}$) between room temperature and 590° C. (1100° F.). The lower CTE of the coating of the present invention reduces thermal stresses that result from in-plane thermal gradients. It also improves the coating's shock resistance. The higher thermal conductivity in the present invention provides adequate insulation while decreasing the size of the in-plane thermal gradients. Materials suitable for the ceramic top layer of the present invention include mullite ($3Al_2O_3.2SiO_2$), zircon ($ZrSiO_4$), sillimanite ($Al_2O_3.SiO_2$), sodium zirconium phosphate ($NaZrPO_4$), fused silica ($SiO_2$), cordierite ($Mg_2Al_4Si_5O_8$), and aluminum titanate ($Al_2TiO_5$). These materials are readily available from commercial suppliers, such as CERAC (Milwaukee, Wis.) and Unitec Ceramic (Stafford, England). Mullite is preferred because it can readily be thermally sprayed to produce a range of porosities. Mullite coated material has a CTE of $3.8\times10^{-6}$°C$^{-1}$ ($2.1\times10^{-6}$°F$^{-1}$) to $4.7\times10^{-6}$°C$^{-1}$ ($2.6\times10^{-6}$°F$^{-1}$) from room temperature to 540° C. (1000° F.) and a thermal conductivity of 1.4 J sec$^{-1}$m$^{-1}$°C$^{-1}$ (9.6 Btu hr$^{-1}$ft$^{-2}$(°F./in)$^{-1}$) to 1.1 J sec$^{-1}$m$^{-1}$°C$^{-1}$ (7.7 Btu hr$^{-1}$ft$^{-2}$(°F./in)$^{-1}$) from room temperature to 590° C. Preferably, the ceramic top layer will have a porosity of about 10% to about 30% and will be about 0.25 mm (10 mils) to about 1.5 mm (60 mils) thick.

All layers of the thermal barrier coating of the present invention can be deposited with conventional methods, such as the plasma spray methods described in U.S. Pat. Nos. 4,481,237 to Bosshart et al. and 4,588,607 to Matarese et al., both of which are incorporated by reference. To achieve good results, the particles sprayed in each step should be fused and crushed, of uniform composition, and be between about 10 μm and about 150 μm in diameter. During deposition, the substrate should be at a temperature of about 200° C. (400° F.) to about 480° C. (900° F.). A person skilled in the art will know the appropriate spray parameters.

The following examples demonstrate the present invention without limiting the invention's broad scope.

EXAMPLE 1

Samples of $ZrO_2$ and mullite coatings were prepared by depositing a 0.1 mm Metco® 443 (Metco division of Perkin Elmer Corp., Westbury, N.Y.) Ni-Cr-Al bond coat, two 0.5 mm CoCrAlY/ceramic layers, and a 0.5 mm ceramic top layer (either $ZrO_2$ or mullite) onto a flat plate of steel. The first CoCrAlY/ceramic layer had a constant composition of 60 wt % CoCrAlY and 40 wt % ceramic (either $ZrO_2$ or mullite). The second CoCrAlY/ceramic layer was graded and had a final composition of 20 wt % CoCrAlY and 80 wt % ceramic (either $ZrO_2$ or mullite). The $ZrO_2$ material was fully stabilized with 20 wt % $Y_2O_3$. The Figure is a photomicrograph of the mullite coating system. The bottom two layers are the two CoCrAlY/mullite layers. The top layer is the mullite ceramic top layer. The bond coat is not visible. All four layers of each coating system were deposited with a Metco external injector spray gun operated at 35 kW with nitrogen primary gas and hydrogen secondary gas. The powder delivery parameters included a feed rate of 72 g/min and a carrier flow of 5.2 standard 1/min, standard set points for ceramic materials. Both samples were subjected a series of heating and cooling cycles to determine when the coatings would fail. A cycle consisted of locally heating the coated surfaces to 850° C. with an oxy-acetylene torch while cooling the back sides of the samples to 650° C. with air jets for 30 sec followed by 30 sec of cooling. The cycle was repeated until the samples showed significant cracking or delamination from the substrate. The $ZrO_2$-coated sample delaminated after 60 cycles. The mullite-coated sample showed some cracking after 155 cycles.

EXAMPLE 2

$ZrO_2$ and mullite coatings were applied to six articulated 4340 steel piston crowns as in Example 1. The pistons were installed in a 6 cylinder diesel engine and the engine was run with a maximum exhaust temperature of 700° C. and a brake mean effective pressure of 1.8 MPa (265 psi) to simulate a military operating cycle. The engine was cycled from high idle (1800 rpm) and no load to maximum power (1800 rpm), spending 2 minutes at each condition, until the coatings failed. The condition of the coatings was monitored by visual inspection at regular intervals. When the engine was stopped for the first inspection at 750 cycles, the $ZrO_2$ coating had already failed. The mullite coating had not failed when the test was ended at 4500 cycles.

EXAMPLE 3

Four more sets of pistons were coated with $ZrO_2$ and mullite coatings as in Example 2. One set of pistons had a single layer, partially stabilized $ZrO_2$ coating (7 wt % $Y_2O_3$) that was 0.375 mm (15 mils) thick. A second set of pistons had a multilayer, partially stabilized $ZrO_2$ coating (6 wt % $Y_2O_3$) with layers of the same thickness as in Example 1. A third set of pistons had a multilayer, fully stabilized $ZrO_2$ coating (20 wt % $Y_2O_3$) with layers of the same thickness as in Example 1. The fourth set of pistons was coated with the same mullite coating as in Examples 1 and 2. The pistons were installed in a 6 cylinder diesel engine and the engine was run with a maximum exhaust temperature of 700° C. and a brake mean effective pressure of 1.8 MPa (265 psi) to simulate a commercial operating cycle. The engine was cycled from high idle (1200 rpm) and no load to maximum power (1800 rpm), spending 2 minutes at each condition, until the coatings failed. The condition of the coatings was monitored by visual inspection at regular intervals. Of the three $ZrO_2$ coatings, the multilayer, fully stabilized coating performed best. It lasted for 700 cycles. The mullite coating had not failed when the test was suspended at more than 8000 cycles.

These and other tests showed that the thermal barrier coating of the present invention can provide a longer service life than prior art coatings. As a result, engines that incorporate a coating of the present invention can operate at more severe conditions and provide better performance and efficiency than prior art engines. The coating can be applied to piston crowns, piston head firedecks, and any other in-cylinder parts that require insulation.

The thermal barrier coatings of the present invention also can extend the service of life of parts used in other rapid thermal cycling applications in which coatings are subjected to large in-plane temperature gradients. For example, coatings of the present invention can be used on injector nozzles in glass furnaces, coal gasifier injector nozzles, high performance exhaust systems for gasoline engines, and other rapid thermal cycling applications.

The invention is not limited to the particular embodiments shown and described herein. Various changes and modifications may be made without departing from the spirit or scope of the claimed invention.

We claim:

1. A metal article having a thermal barrier coating that is subjected to rapid thermal cycling, wherein the thermal barrier coating is characterized by:

(a) a metallic bond coat deposited on the metal article, (b) at least one MCrAlY/ceramic layer deposited on the bond coat, wherein M is Fe, Ni, Co, or a mixture of Ni and Co, and the ceramic in the MCrAlY/ceramic layer comprises mullite, $Al_2O_3$, zircon, sillimanite, sodium zirconium phosphate, fused silica, cordierite, or aluminum titanate, and (c) a ceramic top layer deposited on the MCrAlY/ceramic layer, wherein the ceramic top layer has a porosity of between about 10% and about 30% and comprises a ceramic with a coefficient of thermal expansion less than about $5.4\times10^{-6}$°$C^{-1}$ and a thermal conductivity between about 1 J $sec^{-1}m^{-1}$°$C^{-1}$ and about 1.7 J $sec^{-1}m^{-1}$°$C^{-1}$, whereby the ceramic in the ceramic top layer allows the coating to withstand temperature variations of at least about 110° C. between a temperature at a portion of the coating's surface and the coating's mean surface temperature.

2. The article of claim 1, wherein the ceramic top layer comprises a ceramic with a coefficient of thermal expansion less than about $4.9\times10^{-6}$°$C^{-1}$ and a thermal conductivity between about 1.1 J $sec^{-1}m^{-1}$°$C^{-1}$ and about 1.4 J $sec^{-1}m^{-1}$°$C^{-1}$.

3. The article of claim 1, wherein the ceramic top layer comprises zircon, sillimanite, sodium zirconium phosphate, fused silica, or aluminum titanate.

4. The article of claim 1, wherein the ceramic top layer comprises mullite.

5. The article of claim 1, wherein the thermal barrier coating has a first, constant composition layer of MCrAlY/mullite deposited on the bond coat and a second, graded composition layer of MCrAlY/mullite deposited on the first, constant composition layer of MCrAlY/mullite.

6. The article of claim 1, wherein the ceramic top layer comprises cordierite.

* * * * *